June 4, 1940.  F. N. WELCH  2,203,425
APPARATUS FOR HEATING
Filed March 26, 1938
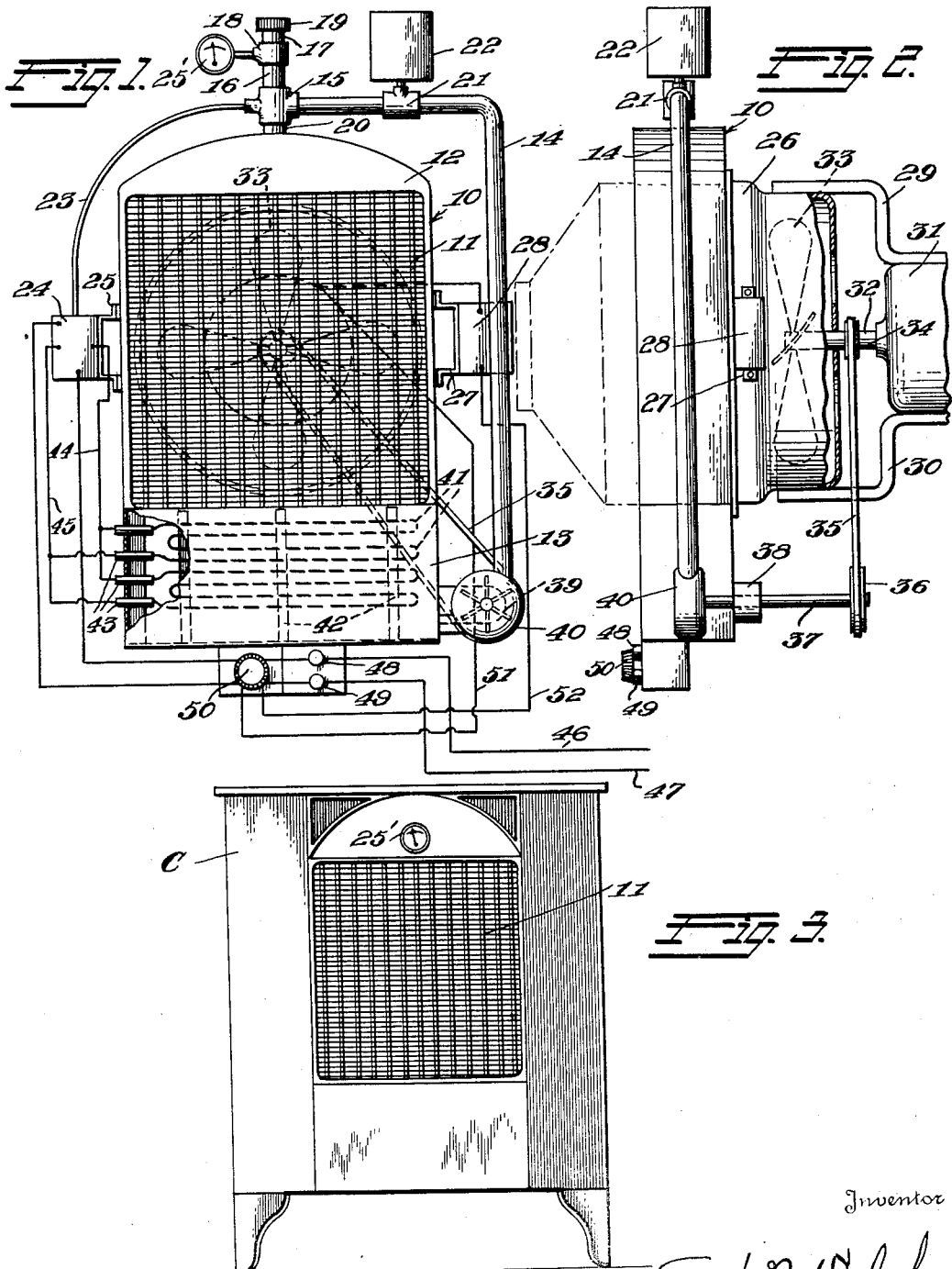

Patented June 4, 1940

2,203,425

UNITED STATES PATENT OFFICE 2,203,425

APPARATUS FOR HEATING

Frank N. Welch, Flint, Mich.

Application March 26, 1938, Serial No. 198,334

1 Claim. (Cl. 237—7)

This invention relates to an apparatus for heating.

More specifically, the invention relates to an apparatus for heating wherein a suitable fluid such as oil is confined in a closed circulatory system which embodies a heat radiator, the fluid being subjected to the action of heat in the lower part of the system whereby the oil circulates through the system and dissipates heat conveyed thereby through the radiator in the course of its circulation.

A primary object of the invention is the provision of apparatus for heating whereby a constant volume of fluid is subjected to the action of heat in the lower zone of a closed circulatory system, the heated fluid resulting in its constant circulation through the system, and whereby the heat carried by the fluid is radiated from a suitable heat radiator in the upper zone of the circulatory system.

A further object of the invention is the provision of heating apparatus comprising a radiator having a header and a relatively deep bottom pan in communication therewith, the header and pan being interconnected by a fluid return connection, and electrical heating means disposed within the pan for heating fluid and causing it to constantly circulate through the radiator and return connection, whereby heat is constantly radiated from the radiator during circulation of the heated fluid therethrough.

A still further object of the invention is the provision of a heating system wherein a constant volume of oil is electrically heated in a compartment below a heat radiator resulting in a circulation of the heated oil through the radiator, and wherein means are provided for forcing air through the radiator and for aiding the circulation of the oil therethrough.

A still further object of the invention is the provision of a heating apparatus embodying a compact, self contained unit and which in accordance with one embodiment of the invention may be in an attractive cabinet form thereby not only serving as a heating means but also possessing artistic value.

A still further object of the invention is the provision of a heating system which is relatively simple in construction, highly efficient in operation and which is capable of being manufactured and installed at relatively low cost.

For a more complete understanding of the nature and objects of the invention, reference should be had to the following detailed description taken in connection with the accompanying drawing, wherein—

Figure 1 is a front elevation of the improved heating apparatus in a preferred embodiment thereof, the heating pan being partially broken away.

Figure 2 is a right side elevation of the structure disclosed in Figure 1.

Figure 3 is a front elevation of a modified arrangement.

Referring now to Figures 1 and 2 of the drawing by reference characters, and wherein like characters designate like parts, 10 designates a housing comprising a radiator 11, a top pan or header 12 and a relatively deep bottom pan 13.

The pans 12 and 13 are in open communication through the radiator 11 and the pans are further in communication through a fluid return pipe connection 14, somewhat in the same manner as in automobile radiator constructions. At the top of pan 12 and centrally thereof the pipe 14 communicates with pan 12 through a connector 15 to which is secured a nipple 16 which in turn is connected with a shorter nipple 17 by means of a connector 18.

Suitably connected with the upper end of the nipple 17 is a filler cap 19, upon removal of which the radiator 11 together with pans 12 and 13 may readily be filled with fluid through nipples 16 and 17, connectors 15 and 18 and the pan extension 20 with which the lower end of connector 15 is engaged.

Interposed in the pipe 14 adjacent connector 15 is a connector 21 with which is secured an expansion tank 22 which is preferably constructed of glass or other transparent material in order to visually indicate the volume of fluid present in the system.

Secured to the connector 15 is the upper end of a relatively small fluid conduit 23 whose lower end is operatively connected with a thermostat 24 which is suitably suported from the housing 10 by a bracket 25. Suitably secured to the connector 18 is a pressure gauge 25¹.

Detachably connected with the rear face of housing 10 and immediately to the rear of radiator 11 is a fan housing 26 to which is secured as by bracket 27 a room controlling temperature thermostat 28.

Supported from the housing 26 by suitable brackets 29 and 30 is a motor 31 whose shaft 32 extends into housing 26 and supports a fan 33 adjacent the free end thereof.

Carried by the shaft 32 intermediate the housing 26 and motor 31 is a pulley 34 which is operatively engaged by a V-belt 35 which is also operatively engaged with a preferably larger pulley 36 secured to one end of a shaft 37 rotatable in a bearing 38.

The opposite end of the shaft 37 carries a propeller 39 disposed within a housing 40 in communication with the pipe connection 14.

Longitudinally disposed within the pan 13 are a series of electrical heating elements 41 which are supported in the vertically disposed porcelain supports 42.

The heating element electrodes 43 are connected in series with the thermostat 24 by wires 44 and 45 and the feeding wires 46 and 47 extend through fuses 48 and 49, master switch 50 and terminate in the thermostat 24.

Operatively connected with the master switch 50 are the fan controlling wires 51 and 52, the latter of which is intercepted by the thermostat 28. A separate fan controlling switch may be incorporated if desired.

The improved apparatus in a preferred embodiment thereof having been described, the operation of same is as follows:

The housing 10 is filled with oil upon removing the cap 19, the oil being filled to a level preferably visible through the transparent expansion tank 22.

The oil selected may be of various kinds but should be of such viscosity as to readily pass through the relatively small pores in the radiator 11 which is illustrated as of the five-fin type but which may be of the honeycomb or other types if desired.

Having filled the system with oil to an efficient level, the master switch 50 is opened whereupon the heating elements 41 will be put in circuit and the fan 33 set into operation, providing of course that the room is at a relatively low temperature.

The fan being set into operation by the motor 31 the propeller 39 will likewise be set into operation and thereby the oil will be caused to circulate rapidly through the system.

As the heated oil passes upward through the radiator 11 the fan 33 will force air through the radiator which due to its intimate contact with the heat radiating fins of the radiator will rapidly become heated and pass upward replacing cooler air to be thereafter forced through the radiator.

The front of the radiator may if desired be provided with means as indicated by dot-and-dash lines in Figure 2 whereby heated air may be conveyed to distant points.

The thermostat 24 is set at maximum for oil temperature and when such temperature is reached the heating elements 41 will be thrown out of circuit.

The thermostat 28 is set for a desired room temperature which upon being reached the fan will stop as will also the oil propeller 39 and accordingly little heat will be dissipated from the radiator. During this time little heat will be required to keep the oil to the temperature setting on the thermostat 24 as a result of which the elements 41 will not be very active.

Upon throwing the master switch 50 the system will be completely out of operation.

It is to be noted that the system is closed and operates under pressure, the pressure gauge 25¹ functioning to relieve any possible pressure above desired maximum in operation.

It is to be particularly observed that the apparatus is very compact thus well adapting it by slight changes in parts to be incorporated in cabinet form as illustrated in Figure 3, wherein a cabinet C of any desired construction has the apparatus housed therein with only the front of the housing 10 being visible.

It will be readily appreciated from the foregoing disclosure that a heating system is provided in accordance with this invention which is compact in structure, highly efficient in operation, and capable of being manufactured, installed and operated at relatively low cost.

While I have disclosed but a single specific embodiment of my invention, same is to be considered as illustrative only, and not restrictive, the scope of the invention being defined in the sub-joined claim.

What I claim and desire to secure by Letters Patent is:

A compact, unitary heating apparatus comprising a fluid circulating radiator having top and bottom pans and an intermediate cellular structure in communication with the pans, a return connection between the pans externally of and adjacent to the radiator, a motor operated fan disposed within a housing engaging the rear face of the cellular structure for forcing air therethrough, electrical fluid heating elements in the bottom pan, a fluid agitator in the bottom of the return connection, a direct reduction drive connection between the fan and fluid agitator, a fluid temperature responsive thermostat for controlling the heating elements, and a room temperature responsive thermostat for controlling the fan and fluid agitator, the thermostats being directly supported by the radiator.

FRANK N. WELCH.